United States Patent
Korolev (10) Patent No.: US 8,024,171 B1
(45) Date of Patent: Sep. 20, 2011

(54) MANAGED RESOURCE SIMULATOR FOR STORAGE AREA NETWORKS

(75) Inventor: Eugenio Korolev, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1133 days.

(21) Appl. No.: 11/540,159

(22) Filed: Sep. 29, 2006

(51) Int. Cl.
*G06F 17/50* (2006.01)
*G06F 9/455* (2006.01)
*G06G 7/52* (2006.01)

(52) U.S. Cl. ............... 703/24; 703/13; 703/25
(58) Field of Classification Search ............ 703/13, 703/24, 25
See application file for complete search history.

(56) References Cited

U.S. PATENT DOCUMENTS

| | | | |
|---|---|---|---|
| 7,315,807 B1 * | 1/2008 | Lavallee et al. | 703/21 |
| 7,412,371 B2 * | 8/2008 | Fisher et al. | 703/17 |
| 2006/0004559 A1 * | 1/2006 | Gladfelter | 703/26 |
| 2006/0031054 A1 * | 2/2006 | Nace et al. | 703/13 |
| 2006/0167667 A1 * | 7/2006 | Maturana et al. | 703/6 |
| 2007/0101199 A1 * | 5/2007 | Kosuge et al. | 714/42 |

* cited by examiner

*Primary Examiner* — David Silver
(74) *Attorney, Agent, or Firm* — Krishnendu Gupta; Gerald P. Kazanjian (57) ABSTRACT

Methods and systems for a managed resource simulator for storage area networks are disclosed. To simulate a managed resource, a first template of generic communication information is executed. The execution of the first template establishes communications between an agent and a server of a storage area network, wherein the agent is a type of agent that manages the managed resource to be simulated. A second template is then populated with data specific to the managed resource to be simulated. The second template further includes generic communication information used to establish communications between an agent and a store process. This generic communication information corresponds to the managed resource to be simulated. The managed resource is then simulated by executing the second template. This allows the simulated managed resource to be tested, and any causes of failed transactions may be corrected, without having access to the actual physical managed resource.

19 Claims, 7 Drawing Sheets

FIG. 1

```
"HDR 001| 86|TS|SST_INITX||<EGS_INITX_BDY_LEN>|EGF 5.2.0.4.0|SDK 5.2.0.4.0|-
1|May 09 2006"
"13:50:19|||02.00|DbTableBase|02.00|InitPacket|1.0.001|5.2.0.4.0|52SP4.03F"
"EB2006.2100.418|N|~|56|DBCOL|01.00|InitPacket|InitPacketId|1.0.001|1|4|Y|N"
"|Y|N|~|DBCOL|01.00|InitPacket|Name|1.0.001|2|512|N|N|N|Y|~|DBCOL|01.00|Ini"
"tPacket|HostName|1.0.001|2|255|N|Y|N|Y|~|DBCOL|01.00|InitPacket|StoreName|"
"1.0.001|2|64|N|Y|N|Y|~|DBCOL|01.00|InitPacket|InternalName|1.0.001|2|10|N|"
"Y|N|Y|~|DBCOL|01.00|InitPacket|FileNamePrefix|1.0.001|2|12|N|Y|N|Y|~|DBCOL"
"|01.00|InitPacket|CompClass|1.0.001|2|12|N|Y|N|Y|~|DBCOL|01.00|InitPacket|"
"Type|1.0.001|2|64|N|Y|N|Y|~|DBCOL|01.00|InitPacket|SubType|1.0.001|2|12|N|"
"Y|N|Y|~|DBCOL|01.00|InitPacket|Version|1.0.001|2|12|N|Y|N|Y|~|DBCOL|01.00|"
"InitPacket|Status|1.0.001|2|20|N|Y|N|Y|~|DBCOL|01.00|InitPacket|IPAddress|"
"1.0.001|2|15|N|Y|N|Y|~|DBCOL|01.00|InitPacket|Port|1.0.001|1|4|N|Y|N|Y|~|D"
"BCOL|01.00|InitPacket|AlternatePort|1.0.001|1|4|N|Y|N|Y|~|DBCOL|01.00|Init"
"Packet|MultiHopAddress|1.0.001|2|50|N|Y|N|Y|~|DBCOL|01.00|InitPacket|Vendo"
"r|1.0.001|2|64|N|Y|N|Y|~|DBCOL|01.00|InitPacket|Coordinator|1.0.001|2|1|N|"
"Y|N|Y|~|DBCOL|01.00|InitPacket|Complex|1.0.001|2|20|N|Y|N|Y|~|DBCOL|01.00|"
"InitPacket|CollectPri|1.0.001|2|1|N|Y|N|Y|~|DBCOL|01.00|InitPacket|Connect"
"sTo|1.0.001|2|64|N|Y|N|Y|~|DBCOL|01.00|InitPacket|CommTime|1.0.001|1|4|N|Y"
"|N|Y|~|DBCOL|01.00|InitPacket|InstallDate|1.0.001|6|19|N|Y|N|Y|~|DBCOL|01."
"00|InitPacket|DataModel|1.0.001|2|12|N|Y|N|Y|~|DBCOL|01.00|InitPacket|PID|"
"1.0.001|1|4|N|Y|N|Y|~|DBCOL|01.00|InitPacket|HasAgent|1.0.001|2|1|N|Y|N|Y|"
"~|DBCOL|01.00|InitPacket|NodeName|1.0.001|2|128|N|Y|N|Y|~|DBCOL|01.00|Init"
"Packet|PriIPAddress|1.0.001|2|128|N|Y|N|Y|~|DBCOL|01.00|InitPacket|SecIPAd"
"dress|1.0.001|2|128|N|Y|N|Y|~|DBCOL|01.00|InitPacket|HostVendor|1.0.001|2|"
"30|N|Y|N|Y|~|DBCOL|01.00|InitPacket|HostType|1.0.001|2|32|N|Y|N|Y|~|DBCOL|"
"01.00|InitPacket|SerialNum|1.0.001|2|30|N|Y|N|Y|~|DBCOL|01.00|InitPacket|G"
"MTOffset|1.0.001|1|4|N|Y|N|Y|~|DBCOL|01.00|InitPacket|UseDST|1.0.001|2
|1|N"
"|Y|N|Y|~|DBCOL|01.00|InitPacket|UseGMTRollup|1.0.001|2|1|N|Y|N|Y|~|DBCOL|0"
"1.00|InitPacket|OSName|1.0.001|2|64|N|Y|N|Y|~|DBCOL|01.00|InitPacket|OSTyp"
"e|1.0.001|2|64|N|Y|N|Y|~|DBCOL|01.00|InitPacket|OSVersion|1.0.001|2|64|N|Y"
"|N|Y|~|DBCOL|01.00|InitPacket|OSLevel|1.0.001|2|64|N|Y|N|Y|~|DBCOL|01.00|I"
"nitPacket|OSRelease|1.0.001|2|64|N|Y|N|Y|~|DBCOL|01.00|InitPacket|OSClass|"
"1.0.001|2|20|N|Y|N|Y|~|DBCOL|01.00|InitPacket|OSVendor|1.0.001|2|64|N|Y|N|"
"Y|~|DBCOL|01.00|InitPacket|HasSeedingAgent|1.0.001|2|1|N|Y|N|Y|~|DBCOL|01."
"00|InitPacket|ParentClass|1.0.001|2|10|N|Y|N|Y|~|DBCOL|01.00|InitPacket|Is"
"AlertReceiver|1.0.001|2|1|N|Y|N|Y|~|DBCOL|01.00|InitPacket|ForceZipRefresh"
"|1.0.001|2|1|N|Y|N|Y|~|DBCOL|01.00|InitPacket|ForceDMRefresh|1.0.001|2|1|N"
"|Y|N|Y|~|DBCOL|01.00|InitPacket|ForceXmlRefresh|1.0.001|2|1|N|Y|N|Y|~|DBCO"
"L|01.00|InitPacket|ArchivePath|1.0.001|2|128|N|Y|N|Y|~|DBCOL|01.00|InitPac"
"ket|PublishedReportsPath|1.0.001|2|128|N|Y|N|Y|~|DBCOL|01.00|InitPacket|In"
"stalledMemory|1.0.001|1|4|N|Y|N|Y|~|DBCOL|01.00|InitPacket|ConfiguredMemor"
"y|1.0.001|1|4|N|Y|N|Y|~|DBCOL|01.00|InitPacket|CPU|1.0.001|1|4|N|Y|N|Y|~|D"
"BCOL|01.00|InitPacket|HostDisplayName|1.0.001|2|512|N|Y|N|Y|~|DBCOL|01.00|"
"InitPacket|EccHostName|1.0.001|2|512|N|Y|N|Y|~|DBCOL|01.00|InitPacket|Doma"
"inName|1.0.001|2|512|N|Y|N|Y|~|DBCOL|01.00|InitPacket|CertificateId|1.001"
"|2|1024|N|Y|N|Y|~|~|1|56|N|4|0|0|1|<Local_Hostname_Short>.<Domain>_EGF|1|"
"<Local_Hostname_Short>.<Domain>|1|1|1|EGF520|1|EGF520|1|CTG|1|CTGAgent|1|"
"CTGAgent|1|5.2.0.4.0|1|active|1|<Local_IpAddress>|1|<EGS_PortNumber>|1|0|1|E
GF520|1|"
```

FIG. 2A

```
"EMC|0||0||0||1||1|1147197019|1|05/09/2006 11:52:45|0||1|3976|0||0||1|"
"<Local_IpAddress>|0||1|Microsoft|1|X86|0||1|-300|1|Y|0||1|Windows 2000|1|"
"Windows|1|5.0|1|Service Pack 4|1|5.0|1|Windows|1|Microsoft|1|Y|1|CTG|0||0||"
"0||0||1||1||1|1047556|1|1047556|1|2|1|<Local_Hostname_Short>|0||1|<Domain>|0
||~|"

"HDR 001|0075|TE|SST_INITX||55|EGF 5.2.0.4.0||<EGS_Component_ID>|05/09/2006
13:50:20.5||"
"|IP=<Local_IpAddress>|Port=<EGS_PortNumber>|HostId=<Host_ID>|ComponentId=<EG
S_Component_ID>"
```

MANAGED RESOURCE SIMULATOR FOR STORAGE AREA NETWORKS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. The components of a storage area network that agents manage are referred to herein as managed resources. The data collected by agents about the managed resources are stored in a database as managed objects, where each managed object corresponds to a managed resource.

SUMMARY

Storage area networks are typically comprised of large numbers of components, all running software applications and communicating with each other hundreds, perhaps thousands, of times in a day. Thus, components in a storage area network may experience errors from time to time, which may result in corrupted data being collected by an agent. To determine the cause of an error and to correct an error requires testing and debugging of the component that experienced the error. Conventional technologies are capable of testing and debugging components of a storage area network that experience errors. Typically, such testing and debugging is performed by the provider of the storage area network component and/or software. However, it may not be feasible for the component that experienced the error to be brought to the provider; nor may it be feasible for an employee or employees of the provider to travel to a customer every time a component experiences an error and/or an agent collects corrupted data about a managed resource.

Embodiments disclosed below allow for simulation of a component of a storage area network that has experienced an error, so that the component need not be in the same physical location as the user who is performing the testing and debugging to discover the source of the error and then repair it so that an agent no longer collects corrupted data about that managed resource. Further, a complete storage area network and its tens, hundreds, or perhaps thousands of components are not needed to simulate one component, or managed resource. Rather, in terms of storage area network components, all that is needed is a storage area network server, an agent, a store process, and a managed object database. In some instances, the agent may itself be simulated.

Before a managed resource may be simulated, at least two templates are created. One template, an agent-server template, includes generic information that is used by a storage area network server and an agent to establish communications with each other. The other template, an agent-store process template, includes generic information that is used by an agent and a store process to establish communications with each other, as well as information that is specific to the managed resource that will be simulated. This information is added to the template prior to a simulation, and this is not present at the creation of the template. These templates may be created by using software that monitors communications between an agent and a storage area network server, and between an agent and a store process, and is able to record and store those communications, such as Mercury Interactive's LoadRunner software. As types of agents differ depending on the type of managed resource they control, a library of templates may be created for each different type of agent. Further, as agents may have different versions, such a library of templates may include multiple templates for the same type of agent, where each of that type of agent is a different version of that type of agent.

The specific data needed for the agent-store process template concerns the actual managed resource that experienced an error and is going to be simulated. In a storage area network, as an agent receives data from its managed resource, the agent communicates that data to a store process. The store process then processes the data and writes the processed data to the managed object database as a managed object. When the store process receives data about a managed resource from an agent, but prior to processing it, the store process keeps a copy of the unprocessed data in a file known as a store trace. A store trace may be considered as a history of all the transactions that occur on a storage area network. Each transaction in a store trace file has an associated transaction identifier, as well as information about the type of agent communicating the transaction and the managed resource managed by that agent. A store process may have a number of store trace files, separated according to periods of time such as days, or may have one large store trace file.

When an error occurs in a managed resource that results in corrupted data being collected by the agent of that managed resource, the store process notes the transaction in its store trace as a failed transaction, which is assigned an identifier. The store trace file containing the failed transaction is sent to the entity who will be simulating the managed resource to attempt to determine the source of the corrupted data and how it may be corrected. The store trace file that contains the initial transaction of that managed resource is also sent, though these transactions may be found in the same store trace file. Data concerning the initial transaction and the failed transaction of the managed resource are then extracted from the relevant store trace file or files, and this data is added to the agent-store process template. The agent-server template and the agent-store process template, which includes the data specific to that managed resource, are then each executed to simulate the managed resource. The simulated managed resource may then be debugged or otherwise tested to determine the cause of the corrupted data in the actual managed resource and a fix for it. While the agent-store process template need only include data from the initial transaction and the failed transaction, any and all other transactions concerning the managed resource to be simulated may also be extracted from the store trace file or files and added to the agent-store process template, to create a complete history of the managed resource in the simulated managed resource.

More particularly, in an embodiment there is provided a method of simulating a managed resource of a storage area network. The method includes executing a first template of generic communication information to establish communications between an agent and a server of a storage area network, wherein the agent is a type of agent that manages the managed resource to be simulated; populating a second template with data specific to the managed resource to be simulated, wherein the second template further comprises generic communication information used to establish communications between an agent and a store process, wherein the generic communication information corresponds to the managed resource to be simulated; and executing the second template to simulate the managed resource.

In a related embodiment, the method may include using the simulated managed resource to discover a problem or problems with the data that agent sends about the actual managed resource, which corresponds to the simulated managed resource. In another related embodiment, populating may include receiving a store trace of an actual managed resource that corresponds to the managed resource to be simulated; extracting data specific to that actual managed resource from the store trace; and populating the second template with the data specific to the actual managed resource. In a further related embodiment, the store trace may include transactions corresponding to the actual managed resource and identifiers for each transaction, and populating may further include examining the store trace to determine the identifier of a failed transaction corresponding to the actual managed resource; and extracting may include extracting data specific to that actual managed resource from the store trace by using the identifier of the failed transaction, wherein the data includes information about the failed transaction and information about an initial transaction of the actual managed resource.

In yet a further related embodiment, executing the second template may include executing the generic communication information and the initial transaction of the actual managed resource to simulate the managed resource; executing the failed transaction; and testing the simulated managed resource to determine the cause of the failed transaction.

In another related embodiment, the method may include creating a first template of generic communication information by recording communications between an agent of a storage area network and a server of the storage area network, wherein the agent is a type of agent that manages the managed resource to be simulated. In yet another related embodiment, the method may include creating a second template of generic communication information by recording communications between an agent of a storage area network and a store process of the storage area network and removing from the communications data specific to the actual managed resource that the agent controls, wherein the agent is a type of agent that manages the managed resource to be simulated.

In another embodiment, there is provided a computer system including a memory, a processor, a display, and an interconnection mechanism coupling the memory, the processor and the display allowing communication there between. The memory of the computer system is encoded with a simulator application. When the simulator application is executed in the processor, it provides a simulator process that simulates a managed resource on a storage area network. The simulator process causes the computer system to perform the operations of: executing a first template of generic communication information to establish communications between an agent and a server of a storage area network, wherein the agent is a type of agent that manages the managed resource to be simulated; populating a second template with data specific to the managed resource to be simulated, wherein the second template further comprises generic communication information used to establish communications between an agent and a store process, wherein the generic communication information corresponds to the managed resource to be simulated; and executing the second template to simulate the managed resource.

In yet another embodiment, there is provided a computer program product, stored on computer readable medium, to simulate a managed resource of a storage area network. The computer program product includes computer program code for executing a first template of generic communication information to establish communications between an agent and a server of a storage area network, wherein the agent is a type of agent that manages the managed resource to be simulated; computer program code for populating a second template with data specific to the managed resource to be simulated, wherein the second template further comprises generic communication information used to establish communications between an agent and a store process, wherein the generic communication information corresponds to the managed resource to be simulated; and computer program code for executing the second template to simulate the managed resource.

It is to be understood that the system of the present application can be embodied solely as a software program, or as a software program operating in conjunction with corresponding hardware. For example, embodiments of the present application may be implemented in EMC's ECC software application that provides graphical configuration management functionality of storage area network resources, as well as the LoadRunner software application manufactured by Mercury Interactive. Embodiments of the present application may also be implemented in computer devices that operate the ECC software and/or the Load Runner software. ECC software is manufactured by EMC Corporation of Hopkinton, Mass., USA. LoadRunner software is manufactured by Mercury Interactive Corporation of Mountain View, Calif., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A-2B is a template including generic communication information for establishing communications between an agent and a server, according to embodiments disclosed herein.

DETAILED DESCRIPTION

Generally, disclosed embodiments include methods and systems for simulating a managed resource on a storage area network. When a managed resource of a storage area network experiences an error, the cause of the error must be determined so that the error may be fixed. However, a person experienced in determining the cause of such an error may not be located in the same place as, or anywhere near, the managed resource that failed. Similarly, it may be impractical to remove the failed managed resource and send the physical unit to such a person.

By simulating the failed managed resource, a user who is performing testing and debugging to discover the source of the error and then repair it need not be in the same physical location as the managed resource. A managed resource may be simulated by using a storage area network server, an agent, a store process, and a managed object database. The agent is of the type of agent that manages the managed resource to be simulated. To simulate the managed resource, at least two templates are created. Each template includes generic information that is used to establish communications between the agent and the storage area network server, and between the agent and the store process, respectively. The template used to establish communications between the agent and the store process also includes information that is specific to the managed resource to be simulated. This information is added to the template prior to a simulation, and thus is not present at the creation of the template. These templates may be created by using software that monitors communications between an agent and a storage area network server, and between an agent and a store process, and is able to record and store those communications. As types of agents differ depending on the type of managed resource they control, a library of templates may be created for each different type of agent. Further, as agents may have different versions, such a library of templates may include multiple templates for the same type of agent, where each of that type of agent is a different version of that type of agent.

The specific data needed for the agent-store process template concerns the actual managed resource that experienced an error and is going to be simulated. In a storage area network, as an agent receives data from its managed resource, the agent communicates that data to a store process. The store process then processes the data and writes the processed data to the managed object database as a managed object. When the store process receives data about a managed resource from an agent, but prior to processing it, the store process keeps a copy of the unprocessed data in a file known as a store trace. A store trace may be considered as a history of all the transactions that occur on a storage area network. Each transaction in a store trace file has an associated transaction identifier, as well as information about the type of agent communicating the transaction and the managed resource managed by that agent. A store process may have a number of store trace files, separated according to periods of time such as days, or may have one large store trace file.

When an error occurs in a managed resource, the store process notes the error in its store trace, and as the error is considered a transaction, assigns the error transaction an identifier. The store trace file containing the error transaction is sent to the person who will run a simulation of the managed resource to attempt to determine the source of the error and how it may be corrected. The store trace file that contains the initial transaction of that managed resource is also sent, though these transactions may be found in the same store trace file. Data concerning the initial transaction and the error transaction of the managed resource that suffered the error are then extracted from the relevant store trace file or files, and this data is added to the agent-store process template. The agent-server template and the agent-store process template, which includes the data specific to that managed resource that suffered the error, are then each executed to simulate the managed resource. The simulated managed resource may then be debugged or otherwise tested to determine the source of the error in the actual managed resource and a fix for that error. While the agent-store process template need only include data from the initial transaction and the error transaction, any and all other transactions concerning the managed resource to be simulated may also be extracted from the store trace file or files and added to the agent-store process template, to create a complete history of the managed resource in the simulated managed resource.

Figure 1:
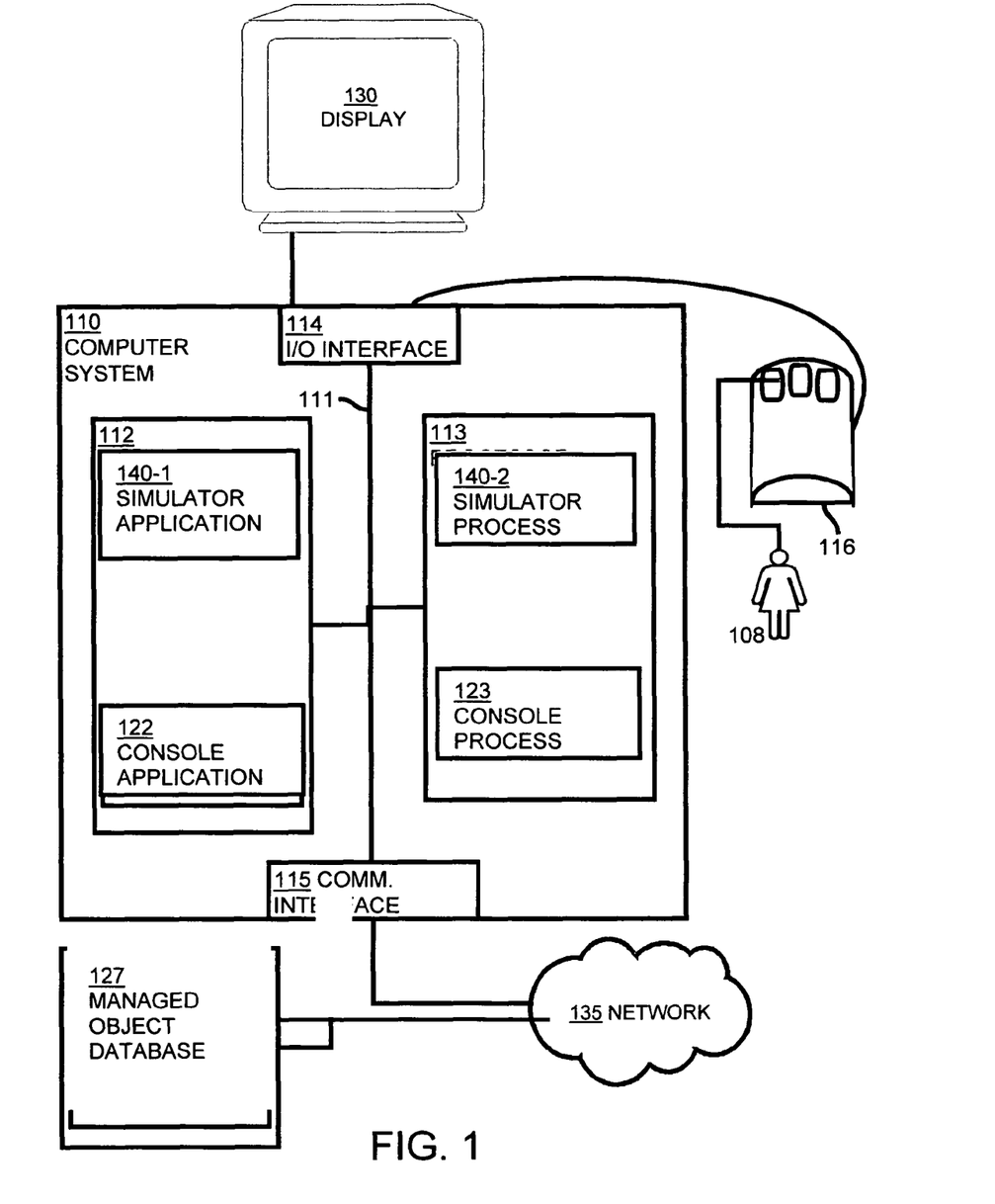
FIG. 1 shows a high-level block diagram of a computer system according to one embodiment disclosed herein.

Embodiments disclosed herein provide for simulating a managed resource on a storage area network, as described below. More particularly, FIG. 1 is a block diagram illustrating example architecture of a computer system 110 that executes, runs, interprets, operates or otherwise performs a simulator application 140-1 and a simulator process 140-2, suitable for use in explaining example configurations disclosed herein to simulate a managed resource (not shown). The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a managed resource debugger to provide input commands and generally debug the simulated managed resource of the storage area network through the graphical user interface that is provided on a display 130. The communications interface 115 enables the computer system 110 to communicate with other devices on a network 135, such as but not limited to components of the storage area network (not shown) and a managed object database 127.

The memory system 112 is any type of computer readable medium and in this example is encoded with a simulator application 140-1 that includes simulator process 140-2. The simulator application 140-1 may be embodied as software code such as data and/or logic instructions (e.g., code stored in the memory system 112 or on another computer readable medium such as a removable disk) that supports processing functionality according to different embodiments described herein. A transactions monitor application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the simulator application 140-1 as well as the transactions monitor application 122. Execution of the simulator application 140-1 in this manner produces processing functionality in a simulator process 140-2. Similarly, execution of the transaction monitor application 122 produces processing functionality in a transaction monitor process 123. In other words, the simulator process 140-2 represents one or more portions or runtime instances of the simulator application 140-1 performing or executing within or upon the processor 113 in the computer system 110 at runtime.

It is noted that example configurations disclosed herein include the simulator application 140-1 itself including the simulator process 140-2 (i.e., in the form of un-executed or non-performing logic instructions and/or data). The simulator application 140-1 may be stored on a computer readable medium (such as a floppy disk), hard disk, electronic, magnetic, optical or other computer readable medium. The simulator application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the simulator application 140-1 in the processor 113 as the simulator process 140-2. Those skilled in the art will understand that the computer system 110 may include other processes and/or software and hardware components, such as an operating system not shown in this example.

Figure 2B:
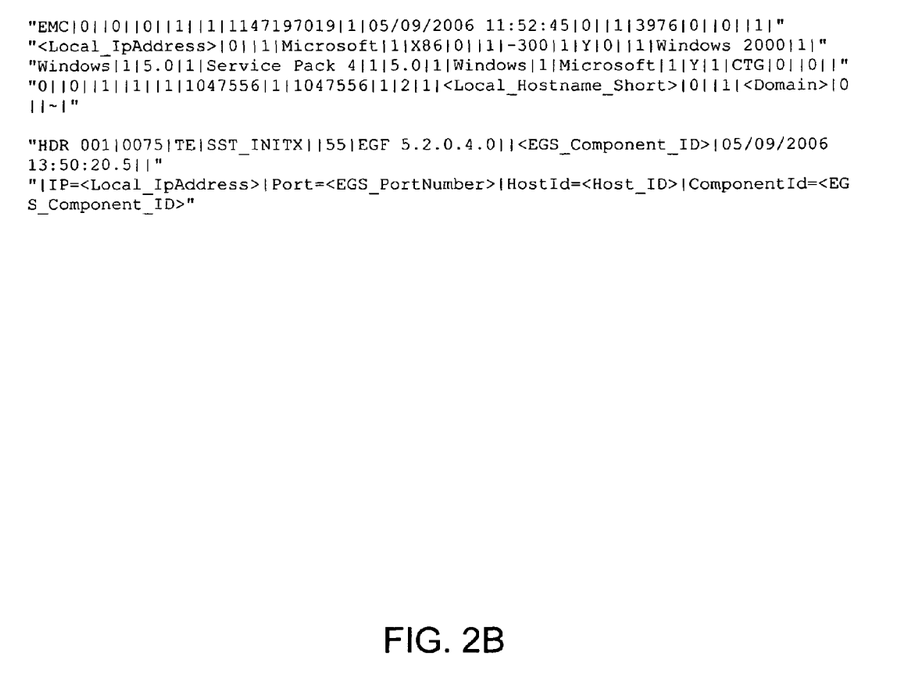
Figure 3:
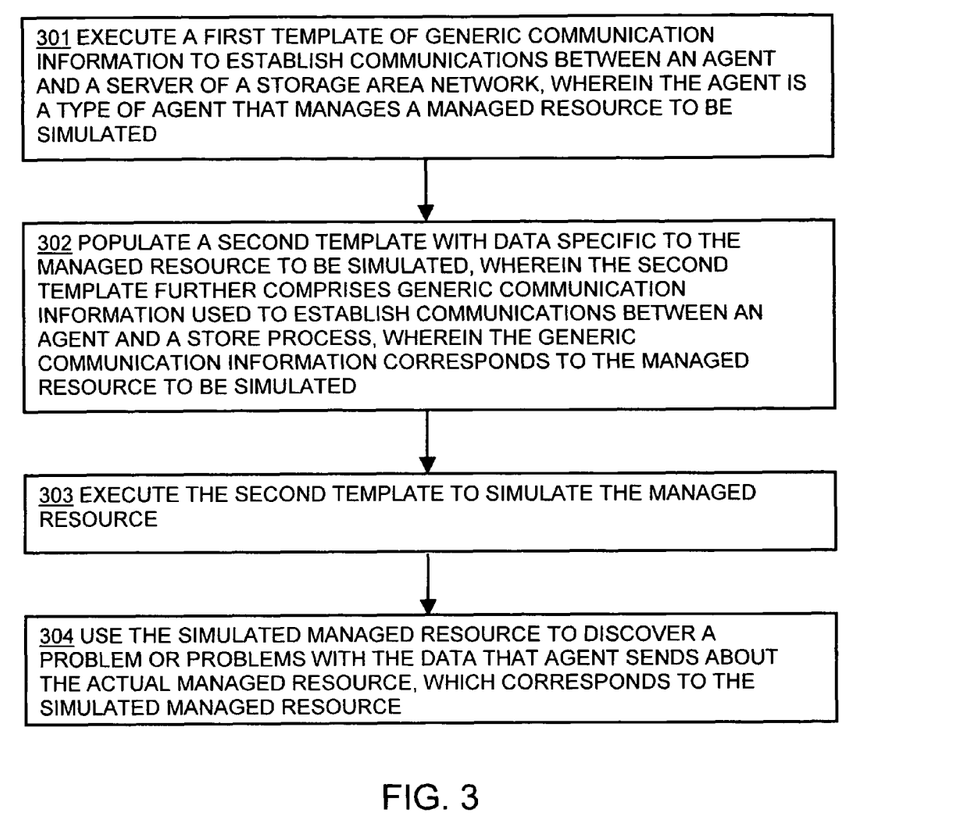
FIG. 3 illustrates a flowchart of a procedure performed by the system of FIG. 1 when simulating a managed resource on a storage area network.
Figure 4A:
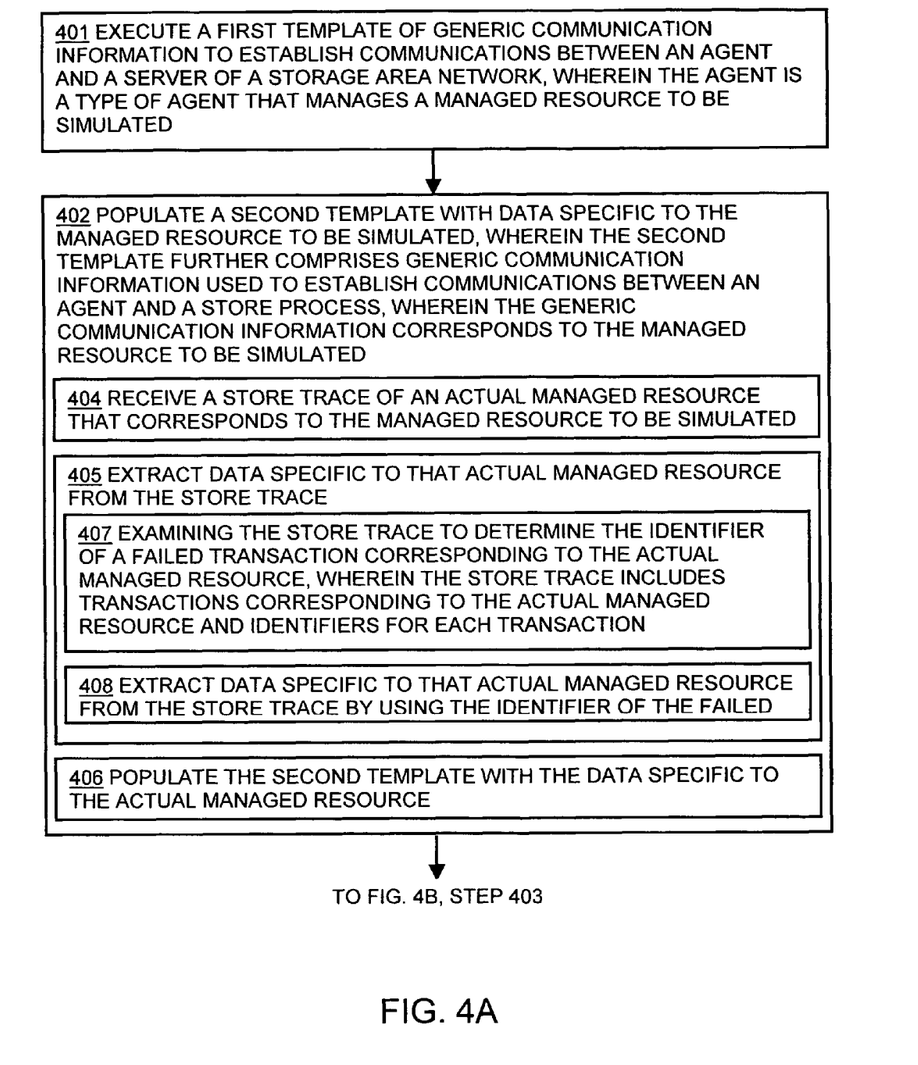
FIGS. 4A-4B illustrate a flowchart of a procedure performed by the system of FIG. 1 when using data from a store trace to simulate a managed resource on a storage area network.
Figure 4B:
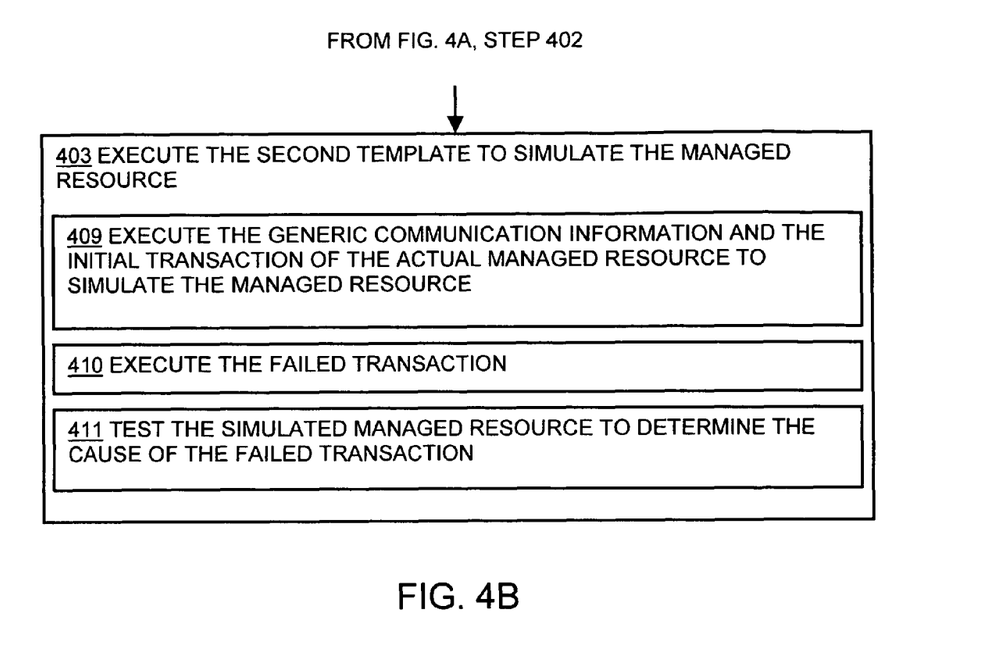
Figure 5:
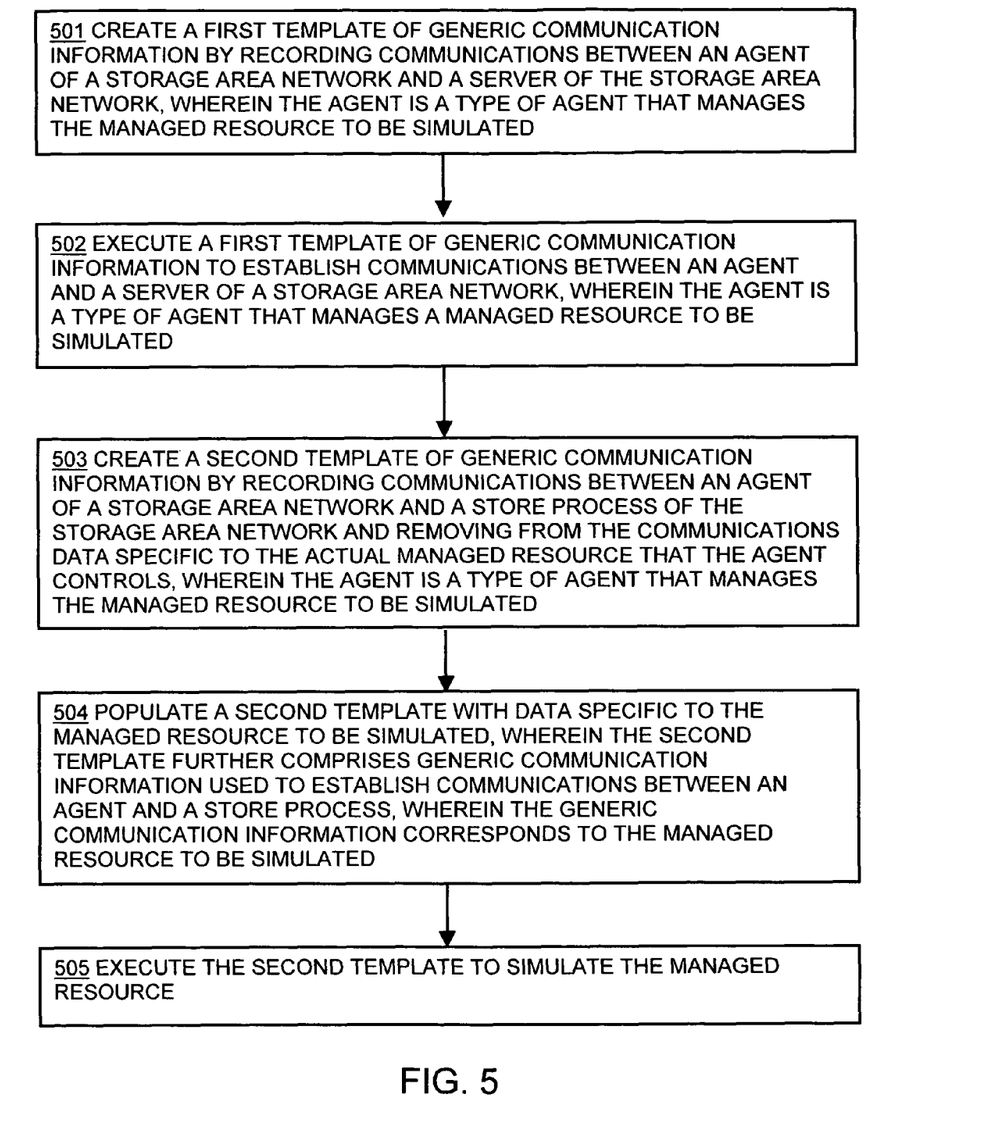
FIG. 5 illustrates a flowchart of a procedure performed by the system of FIG. 1 when creating templates and using the templates to simulate a managed resource on a storage area network.

FIGS. 2A-2B show a template of generic communication information used to established communications between an agent and a server when simulating a managed resource. FIG. 3 illustrates a flowchart of a procedure performed by the system of FIG. 1 when simulating a managed resource on a storage area network. FIGS. 4A-4B illustrate a flowchart of a procedure performed by the system of FIG. 1 when using data from a store trace to simulate a managed resource on a storage area network. FIG. 5 illustrates a flowchart of a procedure performed by the system of FIG. 1 when creating templates, such as the template shown in FIG. 2, and using those templates to simulate a managed resource.

When the Managed Resource data collected by an agent is corrupted, the transaction will fail during processing on the store process. The received transaction will not be persisted in the database; nonetheless, the record of the failure, including a complete transaction will be made in the store trace. Upon discovering the failed transaction, an administrator or other user or manager of that storage area network sends the store trace file containing the failed transaction to a managed resource debugger. The managed resource debugger uses the store trace file to simulate the managed resource, and then tests and/or debugs it to determine the source of the failed transaction and what may be done to prevent the failure. The managed resource debugger has access to some components of a storage area network, including a server, a store process, a managed object database, and an agent of the type of agent that manages the managed resource to be simulated. The managed resource debugger executes the simulator application 140-1, and the simulator process 140-2 is able to simulate the managed resource whose data suffered the failed transaction. To simulate that managed resource, the simulator process 140-2 first executes a first template of generic communication information to establish communications between an agent and a server of a storage area network, wherein the agent is a type of agent that manages the managed resource to be simulated, step 301. For example, if the managed resource to be simulated is a host, then the agent is an agent that manages hosts (a host agent), and the first template contains generic communication information for establishing communications between a SAN server and a host agent. The first template may be taken from a library of templates, as described above, or may be created as will be described below in connection with FIG. 5.

The simulator process 140-2 next populates a second template with data specific to the managed resource to be simulated, step 302. The data specific to the managed resource to be simulated is taken from one or more store trace files of the storage area network that includes the actual managed resource that will be simulated. This process is described in greater detail below in connection with FIGS. 4A-4B. Besides the data specific to the managed resource to be simulated, the second template also includes generic communication information used to establish communications between an agent and a store process, wherein the generic communication information corresponds to the managed resource to be simulated, and is described below in greater detail in connection with FIG. 5. The agent used here is also an agent of the type that manages the managed resource to be simulated by the simulator process 140-2.

The simulator process 140-2 then executes the second template to simulate the managed resource, step 303. The agent acts as if it discovered an actual managed resource connected to it, and informs the store process of this discovery. The simulated managed resource then acts exactly as the actual managed resource did when the failed transaction occurred. By using the simulator process 140-2 to simulate the managed resource, a managed resource debugger or other user is able to parse through the actions of the managed resource and discover the problem or problems with the operation of the actual managed resource that corresponds to the simulated managed resource, step 304. The managed resource debugger or other user of the simulator process 140-2 is able to take whatever steps are necessary to determine the cause of the failed transaction, without making any changes to the actual managed resource and without affecting the storage area network that the actual managed resource is a part of.

FIGS. 4A-4B describe the process of simulating a managed resource in greater detail. The simulator process 140-2 executes a first template of generic communication information to establish communications between an agent and a server of a storage area network, wherein the agent is a type of agent that manages the managed resource to be simulated, step 401. The simulator process 140-2 uses a just-created first template, as described below in connection with FIG. 5, or takes the first template from a library of templates. The simulator process 140-2 next populates a second template with data specific to the managed resource to be simulated, step 402.

More specifically, the simulator process 140-2 receives a store trace of an actual managed resource that corresponds to the managed resource to be simulated, step 404. The store trace includes transactions corresponding to the actual managed resource and identifiers for each transaction. As described above, the store trace may include one or more store trace files, depending on how the storage area network that includes the actual managed resource is managed. The simulator process 140-2 examines the store trace to determine the identifier of a failed transaction that corresponds to the actual managed resource, step 407. The simulator process 140-2 then extracts data specific to that actual managed resource from the store trace, step 405. More specifically, the simulator process 140-2 uses the identifier of the failed transaction to take the data about the failed transaction from the store trace file, step 408. The simulator process 140-2 then uses that data to identify at least the initial transaction for the actual managed resource, i.e., the transaction where the actual agent that managed the actual managed resource discovered the managed resource. This process may also be done manually, by a user 108 opening the store trace file in an editor, searching for the failed transaction, noting the identifier of the failed transaction, and finding the initial transaction for that managed resource and noting its identifier. The user gives the simulator process 140-2 the identifiers of both the initial transaction for the managed resource to be simulated and the failed transaction, and the simulator process 140-2 extracts the relevant data from the store trace file. However achieved, the simulator process 140-2 then populates the second template with the data specific to the actual managed resource, step 406. As with the first template, the simulator process 140-2 uses a just-created second template or takes the second template from a library of templates. In either situation, the second template includes only the generic communication information used to establish communications between an agent and a store process, wherein the generic communication information corresponds to the managed resource to be simulated, and is described below in greater detail in connection with FIG. 5. The agent used here is also an agent of the type that manages the managed resource to be simulated by the simulator process 140-2.

The simulator process 140-2 then executes the second template to simulate the managed resource, step 403. More specifically, to simulate the managed resource, the simulator process 140-2 first executes the generic communication information of the second template and the initial transaction of the actual managed resource as taken from the store trace file, step 409. This allows the agent to discover the simulated managed resource and to communicate this discovery to both the SAN server and the store process. The managed resource debugger or other user is also able to assess the current state of the simulated managed resource, and obtain any data that may be useful in determining what caused a failed transaction to occur.

The simulator process 140-2 then executes the failed transaction, step 410, causing the simulated managed resource to act exactly as the actual managed resource did when the failed transaction actually occurred. The managed resource debugger or other user is then able to test the simulated managed resource to determine the cause of the failed transaction, step 411. Because the failed transaction is simulated, the managed resource debugger or other user may parse through this execution as needed, and/or replay the execution as many times as necessary to help determine the source of the failed transaction.

FIG. 5 describes the process of creating the first and second templates in greater detail. The simulator process 140-2 creates a first template of generic communication information by recording communications between an agent of a storage area network and a server of the storage area network, step 501. The simulator process 140-2 monitors the communications between an actual server and an actual agent of a storage area network. The agent who's communications are monitored is of the type of agent that manages the managed resource to be simulated. As stated above, any number of first templates may be created in this way, such that the simulator process may create a library of first templates that includes templates for all different types of agents and templates for all different versions of the same type of agents. Such a library of templates may be updated when a new version of an agent is created, or if a new type of agent is created. The simulator process 140-2 may then draw upon the library of first templates at any future time, and need not create a first template each time the simulator process 140-2 simulates a managed resource.

After the simulator process 140-2 creates the first template, the simulator process 140-2 executes a first template of generic communication information to establish communications between an agent and a server on a storage area network, wherein the agent is a type of agent that manages the managed resource to be simulated, step 502. The first template is thus a template of generic communication information between the type of agent that manages the managed resource to be simulated and a SAN server.

The simulator process 140-2 also creates a second template of generic communication information, step 503. The simulator process 140-2 records communications between an agent of a storage area network and a store process of the storage area network. The simulator process 140-2 then removes, from those communications, data specific to the actual managed resource that the agent controls. The agent is a type of agent that manages the managed resource to be simulated. As with the first template, the simulator process 140-2 may create a library of second templates.

The simulator process 140-2 then populates a second template with data specific to the managed resource to be simulated, wherein the second template further comprises generic communication information used to establish communications between an agent and a store process, wherein the generic communication information corresponds to the managed resource to be simulated, step 504. Like the first template, the second template is also a template of generic communication information between the type of agent that manages the managed resource to be simulated and a SAN store process. To simulate the managed resource, the simulator process 140-2 executes the second template, step 505.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of simulating a managed resource of a storage area network, the method comprising:

executing a first template of generic communication information, wherein executing the first template of generic information includes establishing communications between an agent and a server of a storage area network, wherein the agent is a type of agent that manages the managed resource to be simulated;

populating a second template with data specific to the managed resource to be simulated, wherein the second template further comprises generic communication information used to establish communications between an agent and a store process, wherein the generic communication information corresponds to the managed resource to be simulated, wherein populating the second template comprises:

examining a store trace to determine an identifier of a failed transaction corresponding to an actual managed resource;

extracting data specific to the actual managed resource from the store trace by using the identifier of the failed transaction, wherein the data specific to the actual managed resource includes information corresponding to the failed transaction and information corresponding to an initial transaction of the actual managed resource; and populating the second template with the data specific to the actual managed resource;

simulating the managed resource by executing the second template, wherein executing the second template comprises:

executing the generic communication information corresponding to the second template and the initial transaction of the actual managed resource;

executing the failed transaction; and determining a cause of the failed transaction by testing the simulated managed resource, the failed transaction including corrupted data collected by the agent.

2. The method of claim 1 comprising:
discovering, via using the simulated managed resource, a problem or problems with the data that agent sends about the actual managed resource, which corresponds to the simulated managed resource.

3. The method of claim 1 wherein populating comprises:
receiving the store trace of the actual managed resource that corresponds to the managed resource to be simulated.

4. The method of claim 3 wherein the store trace includes transactions corresponding to the actual managed resource and identifiers for each transaction.

5. The method of claim 1 comprising:
creating the first template of generic communication information by recording communications between the agent of the storage area network and the server of the storage area network.

6. The method of claim 1 comprising:
creating the second template of generic communication information by recording communications between the agent of the storage area network and the store process of the storage area network and removing from the communications data specific to the actual managed resource that the agent controls.

7. The method of claim 1 comprising:
discovering, via using the simulated managed resource, a problem or problems with the data that the agent sends about the actual managed resource, which corresponds to the simulated managed resource;

wherein populating comprises:
receiving the store trace of the actual managed resource that corresponds to the managed resource to be simulated, the store trace comprising a history of transactions that occur in the storage area network, each transaction in the store trace having an associated identifier and information about the type of agent.

8. The method of claim 7 comprising:
creating the first template of generic communication information by recording communications between the agent of the storage area network and the server of the storage area network; and creating the second template of generic communication information by recording communications between the agent of the storage area network and the store process of the storage area network and removing from the communications data specific to the actual managed resource that the agent controls.

9. The method of claim 8 comprising:
wherein the store trace includes transactions corresponding to the actual managed resource and identifiers for each transaction.

10. The method of claim 1, further comprising:
creating the first template of generic communication information by recording communications between the agent of the storage area network and the server of the storage area network;

creating the second template of generic communication information by recording communications between the agent of the storage area network and the store process of the storage area network and removing from the communications data specific to the actual managed resource that the agent controls;

creating a plurality of templates, each template within the plurality of templates corresponding to a different type of agent and different version of agent;

wherein the data specific to the managed resource to be simulated includes data associated with the initial transaction and with an error experienced by the managed resource, the error being identified from the store trace file as a failed transaction; and wherein populating the second template includes populating the second template prior to simulation of the managed resource.

11. The method of claim 10, further comprising:
discovering, via using the simulated managed resource, a problem or problems with the data that the agent sends about the actual managed resource, which corresponds to the simulated managed resource;

wherein populating comprises:
receiving the store trace of the actual managed resource that corresponds to the managed resource to be simulated, the store trace comprising a history of transactions that occur in the storage area network, each transaction in the store trace having an associated identifier and information about the type of agent.

12. A computer system comprising:
a memory;
a processor;
a display;
an interconnection mechanism coupling the memory, the processor and the display allowing communication there between;

wherein the memory is encoded with a simulator application, that when executed in the processor, provides a simulator process that simulates a managed resource on a storage area network, by causing the computer system to perform the operations of:

executing a first template of generic communication information, wherein executing the first template of generic information includes establishing communications between an agent and a server of a storage area network, wherein the agent is a type of agent that manages the managed resource to be simulated;
populating a second template with data specific to the managed resource to be simulated, wherein the second template further comprises generic communication information used to establish communications between an agent and a store process, wherein the generic communication information corresponds to the managed resource to be simulated, wherein populating the second template comprises:
examining a store trace to determine an identifier of a failed transaction corresponding to an actual managed resource;
extracting data specific to the actual managed resource from the store trace by using the identifier of the failed transaction, wherein the data specific to the actual managed resource includes information corresponding to the failed transaction and information corresponding to an initial transaction of the actual managed resource; and
populating the second template with the data specific to the actual managed resource;
simulating the managed resource by executing the second template, wherein executing the second template comprises:
executing the generic communication information corresponding to the second template and the initial transaction of the actual managed resource;
executing the failed transaction; and
determining a cause of the failed transaction by testing the simulated managed resource, the failed transaction including corrupted data collected by the agent.

13. The computer system of claim 12 comprising:
discovering, via using the simulated managed resource, a problem or problems with the data that agent sends about the actual managed resource, which corresponds to the simulated managed resource;
creating the first template of generic communication information by recording communications between the agent of the storage area network and the server of the storage area network; and
creating the second template of generic communication information by recording communications between the agent of the storage area network and the store process of the storage area network and removing from the communications data specific to the actual managed resource that the agent controls.

14. The computer system of claim 12 wherein populating comprises:
receiving at least one store trace of the actual managed resource that corresponds to the managed resource to be simulated.

15. The computer system of claim 14
wherein the store trace includes transactions corresponding to the actual managed resource and identifiers for each transaction.

16. A computer program product, stored on computer readable medium, to simulate a managed resource on a storage area network, the computer program product comprising:
a tangible computer storage medium having computer program code stored thereon that when executed by a processor causes the processor to perform the operations of:
executing a first template of generic communication information, wherein executing the first template of generic information includes establishing communications between an agent and a server of a storage area network, wherein the agent is a type of agent that manages the managed resource to be simulated;
populating a second template with data specific to the managed resource to be simulated, wherein the second template further comprises generic communication information used to establish communications between an agent and a store process, wherein the generic communication information corresponds to the managed resource to be simulated, wherein populating the second template comprises:
examining a store trace to determine an identifier of a failed transaction corresponding to an actual managed resource;
extracting data specific to the actual managed resource from the store trace by using the identifier of the failed transaction, wherein the data specific to the actual managed resource includes information corresponding to the failed transaction and information corresponding to an initial transaction of the actual managed resource; and
populating the second template with the data specific to the actual managed resource;
simulating the managed resource by executing the second template, wherein executing the second template comprises:
executing the generic communication information corresponding to the second template and the initial transaction of the actual managed resource;
executing the failed transaction; and
determining a cause of the failed transaction by testing the simulated managed resource, the failed transaction including corrupted data collected by the agent.

17. The computer program product of claim 16 comprising:
discovering, via using the simulated managed resource, a problem or problems with the data that agent sends about the actual managed resource, which corresponds to the simulated managed resource;
wherein populating comprises:
receiving at least one store trace of the actual managed resource that corresponds to the managed resource to be simulated.

18. The computer program product of claim 16, further comprising:
wherein the store trace includes transactions corresponding to the actual managed resource and identifiers for each transaction.

19. The computer program product of claim 16 comprising:
creating the first template of generic communication information by recording communications between the agent of the storage area network and the server of the storage area network; and
creating the second template of generic communication information by recording communications between the agent of the storage area network and the store process of the storage area network and removing from the communications data specific to the actual managed resource that the agent controls.

* * * * *